(12) United States Patent
Ryu

(10) Patent No.: US 6,507,616 B1
(45) Date of Patent: *Jan. 14, 2003

(54) VIDEO SIGNAL CODING METHOD

(75) Inventor: Chul Ryu, Kyungki-do (KR)

(73) Assignee: LG Information & Communications, Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,861

(22) Filed: Oct. 28, 1998

(51) Int. Cl.[7] .................................................. H04N 7/32
(52) U.S. Cl. .............................. 375/240.13; 375/240.02
(58) Field of Search ........................ 375/240.12, 240.13, 375/240.14, 240.24, 240.29, 240.02; 348/415.1, 416.1, 420.1, 419.1; 382/236, 238–239, 244; 386/109, 111; 358/261.2

(56) References Cited

U.S. PATENT DOCUMENTS

| | | | | |
|---|---|---|---|---|
| 5,485,214 A | * | 1/1996 | Lin et al. .................. | 348/416.1 |
| 5,563,813 A | * | 10/1996 | Chen et al. .................. | 708/201 |
| 5,608,458 A | * | 3/1997 | Chen et al. .................. | 348/699 |
| 5,963,673 A | * | 10/1999 | Kodama et al. ............. | 382/239 |
| 6,037,987 A | * | 3/2000 | Sethuraman ........... | 375/240.03 |
| 6,192,081 B1 | * | 2/2001 | Chiang et al. ......... | 375/240.05 |

OTHER PUBLICATIONS

Sun et al., MPEG coding performance improvement by jointly optimizing coding mode decisions and rate control, IEEE Trans. on Circuits and Systems for Video Technology, vol. 7, Issue 3, Jun. 1997, pp. 449–458.*

Rose, K., "Deterministic annealing for clustering, compression, classification, regression, and related optimization problems", Proceeding of the IEEE, vol. 86, iss. 11, Nov. 1998, pp. 221–=2239.*

Chul Ryu et al., "Rate Control in Video Coding By Adaptive Mode Selection;" ISCAS '98—The International Symposium on Circuits and Systems, May 31—Jun. 3, 1998, Monterey, California.

* cited by examiner

*Primary Examiner*—Vu Le
(74) *Attorney, Agent, or Firm*—Fleshner & Kim, LLP

(57) ABSTRACT

A video signal coding method is provided which finds proper decision curves according to characteristics of input frames and encodes the optimal macroblock by using the decision curves instead of a fixed motion/no-motion compensation curve and intra/inter coding curve. The optimal mode is selected for each macroblock of input frame and it is determined through a step of judging whether the input frame is intra mode using a given function, a step of judging whether the input frame is inter mode when it is not intra mode using a given function, a step of controlling quantizer using a predetermined critical value when it is not inter mode, and step of performing skip when the quantizer controlling step is not carried out.

31 Claims, 17 Drawing Sheets

PSNR of Coded Output Signal with 192 kbps at 30 fps

Miss America Sequences in CIF

Coded Output Bit Rate with 352 kbps at 30 fps

Salesperson Sequences in CIF

PSNR of Coded Output Signal with 160 kbps at 30 fps

Claire Sequences in CIF

Buffer Content of Coded Signal with 160 kbps at 30 fps

Claire Sequences in CIF

Decision Curve for Motion/No-Motion Compensation

Decision Curve for Intra/Inter Frame Coding

VIDEO SIGNAL CODING METHOD

BACKGROUND OF THE INVENTION

1. Field of the Invention

The present invention relates to a video signal coding method, and more particularly, to a video signal coding method which is able to select the optimal modes for macroblocks when a block based video signal is coded.

2. Discussion of Related Art

In transmitting of video signals outputted from a video coding application program through public switched telephone network (PST), it is preferable that a fixed bitrate is maintained for simple configuration or fixed band width of the network. Accordingly, in order to transmit the video signals in a fixed bitrate, variation in bitrate is reduced using a buffer placed between the output terminal of the encoder and channel. If the encoder controls the bitrate in transmission of video signals, the output bitrate of the encoder can be uniformly maintained to correspond to variable coding quality. However, to obtain the optimal bitrate requires simultaneous using of the two methods, that is, employing of buffer and controlling of the bitrate by the encoder. For this, there have been proposed various techniques which are compatible with the standard decoder and maximize the visual quality of channel bitrate set.

MPEG-1 and H.261 which are the standard models in video coding deal with only quantization parameter based on the buffer fullness, approaches proposed for MPEG-1 and H.261 use previous bit count values as predicted values of bit counts for current macroblock or sub-group-of-block, and each quantization level is controlled accordingly. Another approach uses an approximate value to predict the number of bit for the current macroblock from training sequences under the stationary supposition, controlling each quantization level. Another technique makes a formula of rate-constrained product code, to optimize the combination of quantization selection items.

In general, variation in the output bitrate is decreased and required buffer size is reduced as quantization is frequently controlled. On the other hand, a larger sized buffer is needed when controlling of quantization depends on the time required for extracting the predicted value of the buffer. A modelling technique is widely used when the quantization level is determined based on the buffer fullness. For example, buffer fullness and quantization related analysis models are employed to determine the magnitude of quantization level based on the buffer fullness. In MPEG-1 and H.261, there are fixed functions which determine modes for macroblocks. The encoder has to makes decisions for each macroblock: how to determine the best motion vectors to use, decide whether to code each macroblock as intra or predicted mode, and how to set the quantizer scale.

As a conventional mode selection method, there has been proposed a simple suboptimal method which performs calculation more easily using a computer. This suboptimal method which makes a series of decision options for bitrate control is carried out through the following steps. First of all, motion compensation or no-motion compensation step is performed, which determines whether motion vector is transmitted or processed as '0'. The next step is to determine whether the mode of macroblock is intra or inter mode using motion vector which was found in the motion compensation or no-motion compensation step. In the case of inter coding, a step is implemented, which determines whether residual error is large enough to be coded using discrete cosine transform. The final step is to determine whether the quantizer scale is satisfactory or required to be changed. In each of the steps, functions or rules are used for effective decision. For example, decisions for motion/no-motion compensation and intra/inter coding use fixed functions but decision for code/no-code is determined according to the difference between the magnitudes of error signals.

Furthermore, quantization parameters are determined based on the buffer fullness. The modes for macroblocks and quantizers are determined and macroblocks are coded accordingly through a series of decision procedures. However, when the video coder transmits the video signals, most of the conventional approaches for bitrate control focused on the decision step of determining whether the quantizer scale is satisfactory or required to be changed. For example, the quantizer level is adjusted based on the buffer fullness. Proposed algorithm extends the coding decision options for rate control to motion/no-motion compensation as well as inter/intra decisions. Output bitrate coded is sensitive to the shapes of decision curves. Accordingly, when the bitrate is controlled using the quantizer, quantization error directly affects visual quality, producing various problems.

SUMMARY OF THE INVENTION

Accordingly, the present invention is directed to a video signal coding method that substantially obviates one or more of the problems due to limitations and disadvantages of the related art.

An object of the present invention is to provide a video signal coding method which finds proper decision curves according to characteristics of input frames and encodes the optimal macroblock by using the decision curves instead of a fixed motion/no-motion compensation curve and intra/inter coding curve.

According to an embodiment of the present invention to accomplish the object, the optimal mode is selected for each macroblock of input frame when video signals are coded in a video coder. Preferably, the optimal mode is determined through a step of judging whether the input frame is intra mode using a given function, a step of judging whether the input frame is inter mode when it is not intra mode using a given function, a step of controlling quantizer using a predetermined critical value when it is not inter mode, and step of performing skip when the quantizer controlling step is not carried out.

According to the present invention, it is possible to select the optimal modes to control bitrate so that a video coder whose visual quality variation is smaller compared with the conventional bitrate control by simple quantizer. In a block based video codec, the present invention presents an effective algorithm for selecting the optimal modes for macroblocks. Accordingly, the method proposed by the present invention is different from the previous ones in that it does not manipulate quantizer to meet target bitrate. Instead it finds the optimal macroblock modes which extract consistent visual quality to meet the target bitrate.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incor- In the drawings.

DETAILED DESCRIPTION OF PREFERRED EMBODIMENT

Reference will now be made in detail to the preferred embodiments of the present invention, examples of which are illustrated in the accompanying drawings.

Figure 1:
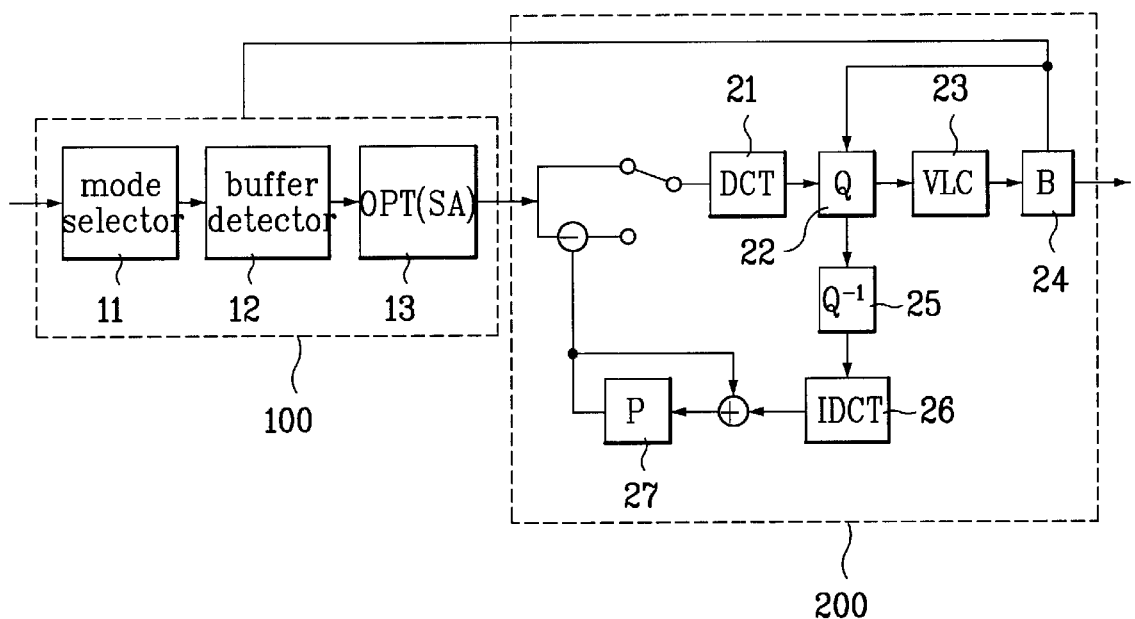
FIG. 1 is a block diagram of a conventional AMS video coder.
Figure 2:
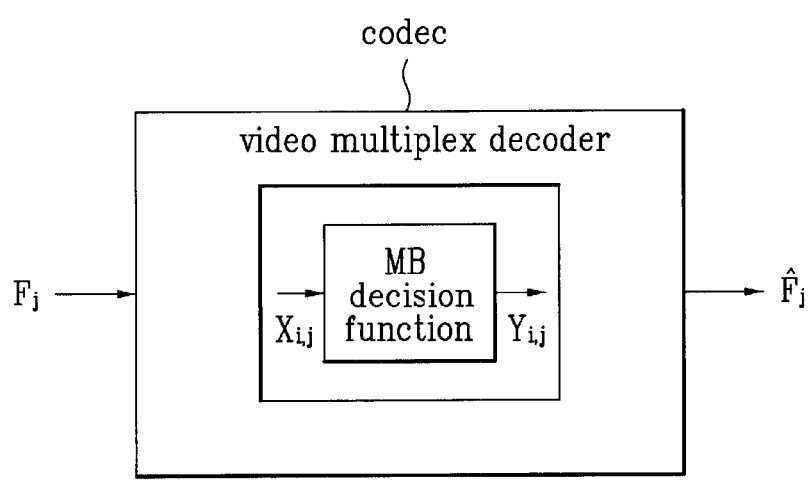
FIG. 2 is a simplified structure of the video coder of FIG. 1.

FIG. 1 is a block diagram of a conventional adaptive mode selection (AMS) video coder. Referring to FIG. 1, the AMS video coder consists of a mode controller 100 and encoder 200. Mode controller 100 includes a mode selector 11 for determining coding modes for macroblocks of input frame, a buffer 12 for storing video signals outputted from mode selector 11 to observe if overflow or underflow occurs, determining whether to skip corresponding block, and an annealing optimization module 13 for obtaining the optimal decision curve coefficient and λ from the output of the buffer using a given mode. Encoder 200 includes a discrete cosine transform (DCT) module 21 for transforming a spacial domain value into a transmission domain value, a quantizer 22 for dividing the output of DCT module 21 into various levels to specify them as predetermined values, a variable length coder (VLC) 23 for coding the quantized values to meet a predetermined mode, a buffer 24 for observing the amount of signal outputted from VLC 23 to determine whether to transmit it or to control the quantization level and code it, an inverse quantizer 25 for inverse-quantizing signals outputted from quantizer 22 to predict it, an inverse discrete cosine transform (IDCT) module 26 for transforming a transmission domain value into a spatial domain value to predict signals outputted from inverse quantizer 25, and a predictive module 27 for predicting the motion of signal outputted from IDCT module 26 to carry out motion compensation when the frame mode is inter mode.

The present invention presents an effective algorithm for selecting the optimal modes for macroblocks in a block based video codec. These modes are selected by optimal decision curves which are sequentially determined by the relation of target bitrate and distortion. Characteristic decision curves for frames are applied to all macroblocks. These decision curves are determined by repeatedly comparing the target bitrate which minimizes encoding distortion with output bitrate. This repeated procedure having no relation with the channel buffer fullness ensures that the decision curves are optimal using simulated annealing optimization techniques. Upon determination of the optimal decision curves, the optimal modes for macroblocks are selected based on the decision curves which minimize the overall distortion for a given bitrate. An embodiment of the present invention optimizes two different decision curves, motion/no-motion compensation decision curve and intra/inter coding decision curve.

When let F and $\overline{F}$ be input and reconstructed frames of the video codec, F and $\overline{F}$ can be partitioned into groups of macroblocks as shown in the following expression (1).

$$F=(X_0, X_1, X_2, \ldots X_{L-1})$$

$$\overline{F}=(\overline{X}_0, \overline{X}_1, \overline{X}_2, \ldots \overline{X}_{L-1}) \tag{1}$$

In this expression, each macroblock $X_{i,j}$ in $F_j$ can be coded using only one of N possible modes given by the set S shown in the following expression (2).

$$S=\{M_0, M_1, M_2, \ldots, M_{N-1}\} \tag{2}$$

Let $M_k^i \in S$, where k=0,1, ..., N−1, be the mode selected to code a macroblock $X_{i,j}$. The number i and j represent the index of macroblock and frame, respectively. Let $y_{i,j}$ be data of a macroblock to be coded, generated by processing of a selected mode $M_k^i$ and $\overline{X}_{i,j}$ be the output after decoding of corresponding block. In general, $y_{i,j}$ can be represented as follows depending on which mode it is assigned with.

$y_{i,j}=0$, if skipped $y_{i,j}=X_{i,j}$, if intra coded $y_{i,j}=X_{i,j}-X_{i|,j-1}$, if inter coded $\tag{3}$ $X_{i|,j-1}$ represents a ith macroblock of (j−1)th frame with motion vector Δ, where Δ=0, if no MC $\Delta=\delta_{x,y}$, if MC $\tag{4}$ $\delta_{x,y}$ is the result of motion compensation algorithm. The decision curve for motion/no-motion compensation can be represented as a polynomial with order P−1, $$g(x) = \sum_{k=0}^{P-1} a_k x^k \qquad (5)$$

Figure 3:
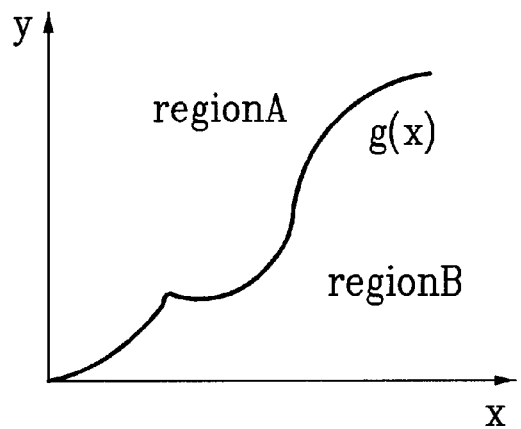
FIG. 3 is a decision curve which divides the region into A and B for motion and no-motion compensation.

The equation (5) determines whether the macroblock is encoded using motion or no-motion compensation through a curve which divides the first quarter of a plane into two regions. FIG. 3 shows an example of decision curve which divides the region into A and B for motion and no-motion compensations. The X-axis in FIG. 3 is determined by the sum of absolute differences between pixel values in $X_{i,j}$ and $X_{i,j}$ blocks for a given i and j as follows $$x(X) \equiv |X_{i,j} - X_{i,j-1}|i, j\frac{1}{256}\sum_m \sum_n |X_{i,j}(m,n) - X_{i,j-1}(m,n)| \qquad (6)$$

where the numbers of m and n are indexes in the macroblock. Variable y is defined as the sum of absolute differences between pixel values of $X_{i,j}$ and $X_{i|\subseteq,j-1}$ $$y(X) \equiv |X_{i,j} - X_{i|,j-1}|i, j\frac{1}{256}\sum_m \sum_n |X_{i,j}(m,n) - X_{i|,j-1}(n)| \qquad (7)$$

The motion vector $\Delta$ is determined through the curve $g(X)$ as follows.

$\Delta = 0$, if $y \geq g(x)$ $\Delta = \delta_{x,y}$, if $y < g(x)$ $\qquad (8)$ While the sum of absolute differences between $X_{i,j}$ and $X_{j-1}$, and $X_{i,j}$ and $X_{i|\Delta,j-1}$ is used, the modes for motion and no-motion compensations are determined depending on where (x,y) is placed using $g(x)$ for a given $X_{i,j}$ and $X_{i,j-1}$. Therefore, the objective is to find the coefficients $a_k$ of the polynomial which minimizes the global coding distortion $D = D_j(a_k)$ of the jth frame at a given bitrate R.

$$arg\left\{\min_{a_k} D_{F_j}(a_k)\right\} \text{ with} \qquad (9)$$

$$R_{F_j}(a_k) \leq R$$

As described above, it is possible to obtain the solution for the unconstraint optimization problem expressed in the following equation (10) instead of the constraint optimization problem of expression (9).

$$arg\left\{\min_{a_k} J_{F_j}(a_k)\right\} = D_{F_j}(a_k) + \lambda \cdot R_{F_j}(a_k) \qquad (10)$$

This case, however, is to find parameter $a_k$ not parameter $\lambda$ of the quantizer. $\lambda$ must be found to solve the equation (10) but the problem can be simplified using the fact that $\lambda$ is the slope of R-D curve at a selected optimal point which meets the constraint and characteristic of convex R-D curve. That is, if the R-D curve can be used, the slope at the point of (x1,y1) on the R-D curve, where x1 is desired bitrate and y1 is unknown minimum distortion point, is found to obtain $\lambda$. Therefore, the unconstraint problem can be explained using fixed $\lambda$ as follows, and the solution for $a_k^*$ which minimizes the following equation (11), the Lagrangian cost function, can be obtained for a given $\lambda > 0$ using the following equation (11).

$$J_{F_j}(a_k^*) = \min_{a_k}\left(D_{F_j}(a_k) + \lambda R_{F_j}(a_k)\right) \qquad (11)$$

The constraint problem corresponding the equation (9) can be represented as follows.

$$D_{F_j}(a_k^*) = \min_{a_k} D_{F_j}(a_k) \text{ such that } R_{F_j}(a_k^*) \leq R \qquad (12)$$

It is clear that the constraint problem of the equation (12) has the same solution as that of the unconstraint problem of the equation (9), and this is possible when $R = R_{F_j}(a_k^*)$ because $\lambda$ is selected to satisfy the constraint optimal value.

It should be noted that the optimal solution may not exist when $\lambda > 0$ depending on R-D characteristic. For all $\lambda$ which is not negative value, the solution of the constraint problem is identical to that corresponding unconstraint problem. However, it important that $a_k^*$ becomes the solution for the constraint problem when $R_{F_j}(a_k^*)$ is R for a given $\lambda$. In other words, $\lambda$ can be obtained when R is given and the unconstraint problem can be solved accordingly, obtaining desired solution $a_k^*$ which meets $R_{F_j} \leq R$. Here, R can be obtained from the point on R-D curve whose slope is $\lambda$. However, it is difficult to actually obtain the R-D curve for various decision curve parameters (in a case that the quantizer takes a constant). That is, it takes quite a long period of time to obtain the R-D curve. NxM dimensional searching is needed for data point of R-D curve where the numbers of coefficients for two decision curves (for example, motion/no-motion compensation curve and intra/non-intra coding decision curve) are N and M. To maximize the computation, the values of $\lambda$ between 0 (minimum distortion, maximum rate) to infinity (maximum distortion, minimum rate) are searched and the optimal coefficient $a_k^*$ is obtained. Subsequently, bitrate $R_{F_j}(a_k^*)$ is calculated to confirm whether to approach a desired bitrate. When the bitrate obtained is sufficient approximate value, the optimal decision curves are defined depending on parameter $a_k$ used during the computation.

To solve the equation (11), $\lambda$ as well as $a_k$ must be searched to obtain the constraint minimum cost function value. When consistency is maintained in variation in pictures between frames, it is considered that the variation in the value of $\lambda$ is not severe between the frames. This suggests that the variation in coded bitrate in each frame is small between the frames. Therefore, instead of obtaining $\lambda$ for each frame, using the previous $\lambda$ for frames which are sequentially generated reduces the complexity in processing with a computer.

Since $\lambda$ can be analyzed as the quality index of coded frames, it is important to obtain optimal $\lambda$ for a period starting from encoding of the first frame until picture variation occurs (for example, in the case of cutting of picture). Distortion of the jth frame for macroblocks can be extended as follows $$D_{F_j}(a_k) = E\{|F_j - \bar{F}_j|^2\} = \frac{1}{L}\sum_{i=0}^{L-1} |X_{i,j} - (X_{i|j-1} + \bar{X}_{i,j}|^2 \qquad (13)$$

Therefore, the Lagrangian cost function can be changed to the following equation (14).

$$J_{F_j}(a_k^*) = \min_{a_k}\{D_{F_j}(a_k) + \lambda R_{F_j}(a_k)\} = \quad (14)$$

$$\min\left\{\frac{1}{L}\sum_{i=0}^{L-1} |X_{i,j} - (X_{i|,j-1} + X_{i,j}|)^2 + \lambda R_{F_j}(a_k)\right\}$$

where $$\overline{X}_{i,j} = D^{-1} \cdot \overset{ak-1}{Q} \cdot Q \cdot D(X_{i,j} - X_{i|,j-1}), F_j = \text{Frame } j\left(=\sum_i X_{i,j}\right), \text{ and } \overline{F}_j =$$

Reconstructed frame $$j\left(=\sum_i \overline{X}_{i,j}\right)$$

Here, D and $D^{-1}$ denote DCT and IDCT, and Q and $Q^{-1}$ denote quantization and inverse quantization, respectively. In case of intra and inter frame codings, the equations (14), (6) and (7) are replaced by the following equations (15) and (16).

$$x(X) \equiv \text{var}(X_{i,j}, X_{i,j-1})i, j\frac{1}{256}\sum_m \sum_n (X_{i,j}(m,n) - X_{i,j-1}(m,n))^2 \quad (15)$$

$$y(X) \equiv \text{var}(X_{i,j}, X_{i|,j-1})i, j\frac{1}{256}\sum_m \sum_n (X_{i,j}(m,n) - X_{i,j-1}(m,n))^2 \quad (16)$$

These are the unconstraint optimal formulas for the proposed problem, and a stochastic annealing optimization algorithm is employed to find the coefficients $a_k$ in equation (5) which minimizes the distortion in equation (14).

Bitrate Control by Adaptive Mode Selection

In applications for H.261 encoding, the Lagrangian multiplier of unconstraint function must be controlled to generate decision curves in order to create proper modes to satisfy the bit count value of current frame. The content of buffer is predicted using the bit count of previously coded frames according to input encoding parameters such as frame rate, channel rate and buffer size.

Buffer control is required to adjust the average bitrate for desired one. In general, the state of buffer is retransmitted to the encoder which selects quantizers to avoid the buffer being overflowed or underflowed. However, the conventional bitrate controlling method using mapping method between quantizers and buffer record does not produce satisfactory encoding result because the number of coded bits generated from frames (I, P and B) of various modes varies widely. Accordingly, there will be explained a method of setting the state of alerting overflow and underflow of the buffer according to an embodiment of the present invention. Let $R_f$ and $R_c$ denote frame rate (fps) and channel rate (bps), and B denote buffer size in k msec (kRc) of the channel rate, respectively. Let input rate to the buffer be represented as the following equation (17).

$$R_{in} = R_1 + R_2 + R_3 + \ldots + R_n = R_f r_1 + R_f r_2 + R_f r_3 + \ldots + R_f r_n \quad (17)$$

assuming there are n frames coming into encoder and the unit of $R_i$ (i=1, ..., n) is in bps. Using above notations, the contents of buffer can be represented as follows, $$B_L(t = n^-) = \sum_{i=0}^{n-1} R_f r_i - nR_c \quad (18)$$

$$B_L(t = n^+) = \sum_{i=0}^{n-1} R_f r_i - (n+1)R_c$$

The upper part and lower part of equation (18) represent the state of buffer just after the nth frame is temporarily stored in the buffer and coded, and just before the (n+1)th frame is temporarily stored in the buffer, respectively. In order to avoid the buffer being overflowed or underflowed, the buffer level, $B_L$, is controlled as follows $$\alpha B \leq B_L < \beta B \quad (19)$$

where, $\alpha + \beta = 1$, $\alpha \geq 0$, $\beta \geq 0$, $\alpha \leq \beta$.

The buffer can avoid overflow or underflow if terms in equation (18) meets equation (19). Accordingly, the following equation (20) is possible.

$$\alpha\beta \leq \sum_{i=0}^{n-1} R_f r_i - (n+1)R_c \quad (20)$$

$$\sum_{i=0}^{n-1} R_f r_i - nR_c < \beta B$$

Here, since B is represented as channel rate, the above equation (20) can be extended as follows $$\alpha k R_c \leq \sum_{i=0}^{n-1} \left(\frac{R_f}{R_c}\right) r_i - (n+1) \quad (21)$$

$$\sum_{i=0}^{n-1} \left(\frac{R_f}{R_c}\right) r_i - n < \beta k$$

Figure 4:
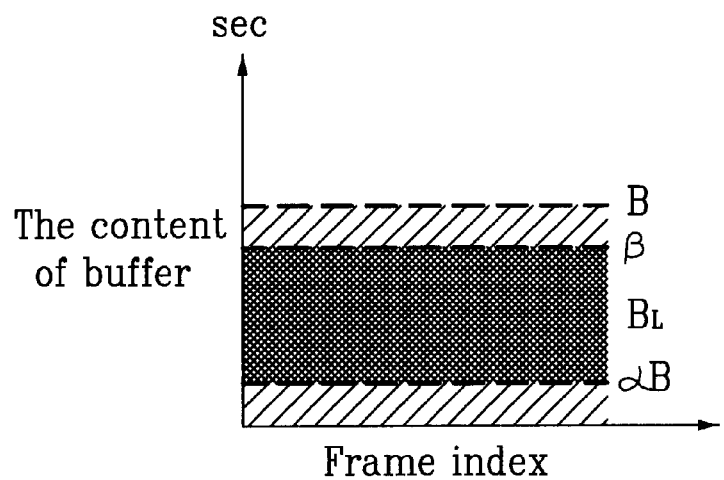
FIG. 4 shows predetermined bounds to alert when buffer reaches underflow or overflow.

By varying $\alpha$ and $\beta$, the bounds to alert when buffer reaches underflow or overflow can be preset. FIG. 4 shows an example of the bounds, upper and lower bounds.

Bitrate control according to quality coefficient $\lambda$ is explained below. The bitrate in the approach proposed by the present invention is controlled by quality coefficient $\lambda$ not by conventional quantizer, and Lagrangian multiplier is adjusted depending on the state of buffer. When the content of buffer is in underflow alert state (for example, $0 < B_L < B$), Lagrangian multiplier $\lambda$ in equation (14) is decreased to provide distortion constraint rather than bitrate constraint. When the content of buffer reaches upper bound, $\beta B$, $\lambda$ is increased to allow the modes of macroblocks to use skipping mode.

Figure 5A:
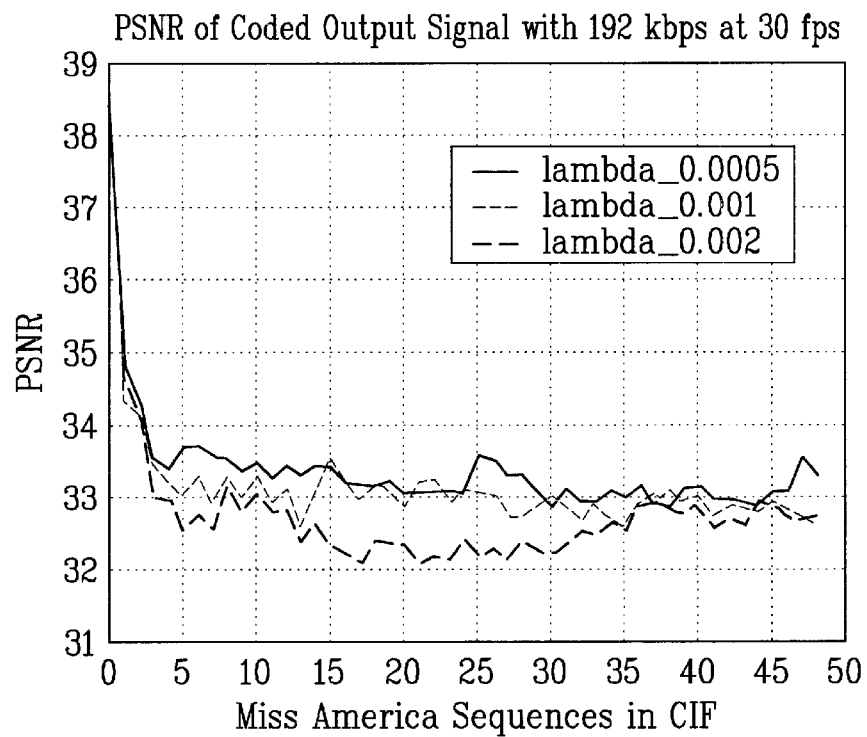
FIGS. 5A and 5B are graphs showing PSNR and buffer fullness for various forms of λ.
Figure 5B:
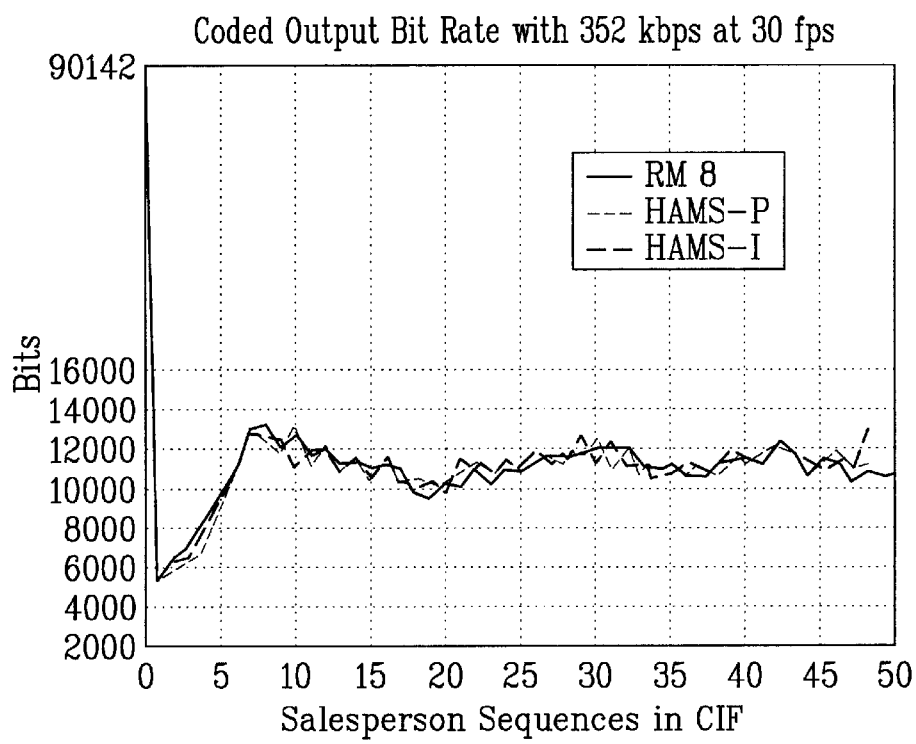

By increasing $\lambda$, algorithm gives more favor to bitrate constraint than distortion constraint. Once the optimal coefficients of the decision curve are found, each macroblock is coded according to the mode based on the decision curve found. FIGS. 5A and 5B show Power Signal-to-Noise Ratio (PSNR) and buffer fullness for various forms of $\lambda$. As shown in FIGS. 5A and 5B, the small increment in $\lambda$ reduces PSNR and buffer state. The decrement in $\lambda$ increases the buffer state but decreases PSNR before overflow occurs. Accordingly, coded bitrate can be controlled by adjusting $\lambda$ according to the buffer state not to allow overflow or underflow to occur.

To obtain the optimal $\lambda$ when overflow or underflow occurs in each frame requires a period of time. The procedure can be carried out if parameter $\lambda$ is used for frame unit.

A method employed in a simulation in order to avoid the buffer being overflowed is expressed as follows $$\lambda_{j+1} = \lambda_j + \lambda_j \left( \frac{R_{F_j}}{R - R_{F_j}} \right) = \lambda_j \left( \frac{R}{R - R_{F_j}} \right) \quad (22)$$

where the increment in λ depends on the coded bitrate of previous frame. Equation (22) means that the increment is small in λ as long as the difference between a desired bitrate and coded bitrate of the jth frame is large, and the increment becomes large when the difference is small. When the content of buffer reaches underflow state, λ can be changed by decreasing its value as follows.

$$\lambda_{j+1} = \lambda_j - \lambda_j \left( \frac{R_{F_j}}{R - R_{F_j}} \right) = \lambda_j \left( \frac{R - 2R_{F_j}}{R - R_{F_j}} \right) \quad (23)$$

Figure 6:
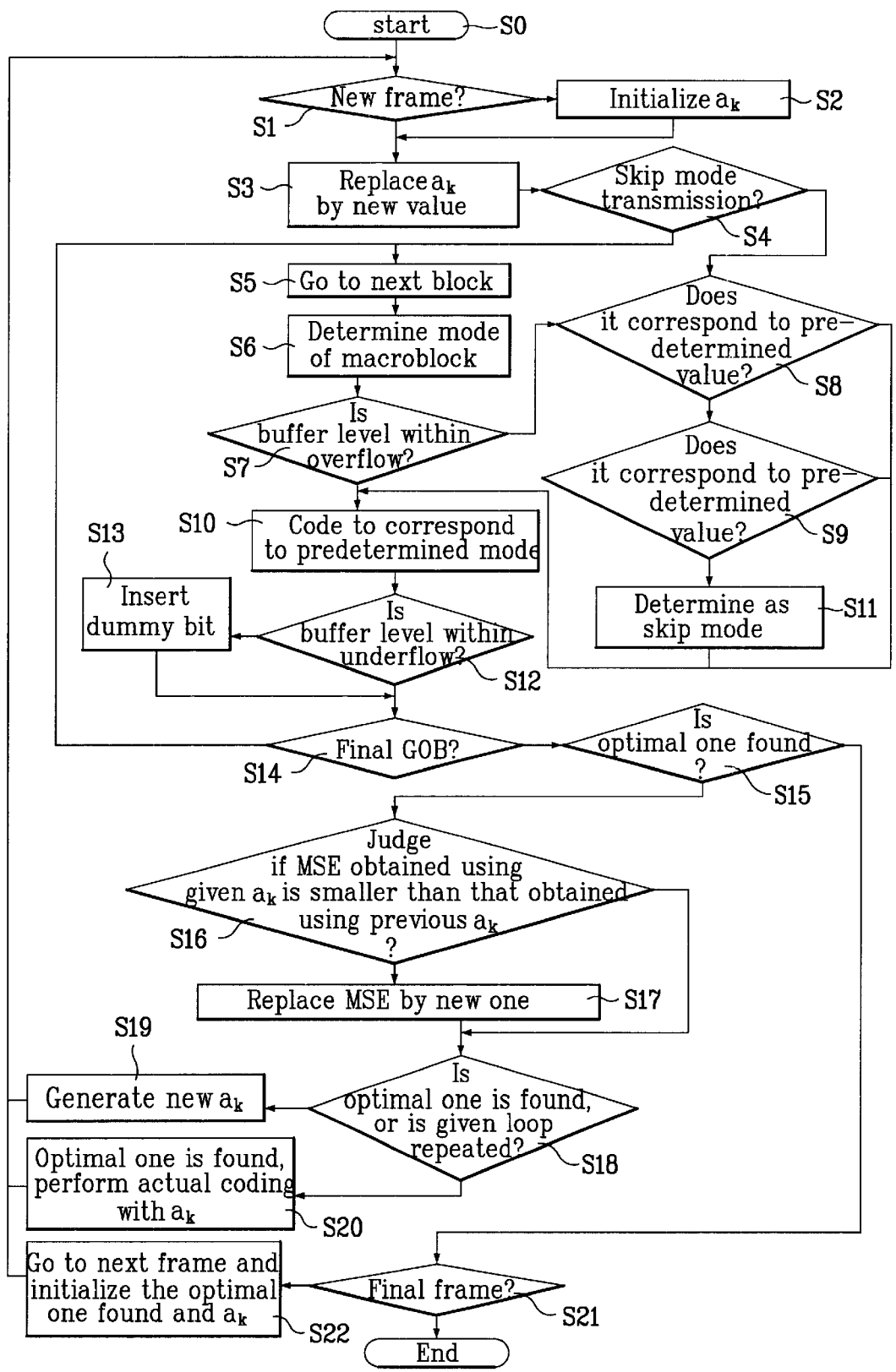
FIG. 6 is a flow diagram showing AMS algorithm according to the present invention.

FIG. 6 is a flow diagram showing AMS algorithm according to the present invention. Referring to FIG. 6, upon inputting of frame, mode controller 100 of the present invention judges if the input frame is new (S1). Coefficient $a_k$ of decision curve is initialized (S2) and then it is replaced by new value (S3) when the input frame is new, and the coefficient is replaced without initialization when the input frame is not new one. Subsequently, it is judged if it is skip mode transmission according to alerting of a predetermined maximum value (overflow) or minimum value (underflow) (S4). When it is not skip mode transmission in step S4, the procedure goes to group of next block (S5). Here, GOB consists of thirty-three macroblocks. Then, the mode of macroblock is determined (S6). Thereafter, it is determined whether the buffer level is within overflow level (S7).

Subsequently, when it is skip mode transmission in step S4 or buffer level is within overflow level in step S7, they are sequentially compared with predetermined critical values (S8, S9), and skip mode is determined if they all correspond to the values (S11). Virtual coding is performed (S12) when the buffer level is not within overflow level in step S7 or after determination of skip mode in step S11. Here, it is judged that if the buffer level is in underflow state (S12), and dummy bit is inserted when it is (S13). When the buffer level is not in underflow state in step S12, it is judged that if it is the final GOB (S14), feeding back to step S5 when it is not the final GOB.

Otherwise, it is judged if group of optimal blocks is found when it is the final GOB (S15). When the group of optimal blocks is not found, it is judged that if the mean square error obtained using $a_k$ given in step S3 is smaller than that for previous $a_k$ (S16). If smaller, the smaller value replaces the previous mean square error value (S17). It is judged if the group of optimal blocks are found or a given loop is repeated (S18) when the mean square error obtained using $a_k$ given in step S3 is not smaller than that for previous $a_k$, or after execution of step S17. When the group of optimal blocks are not found and given loop is not repeated, new $a_k$ is generated (S19). On the other hand, when the procedures are performed in step S18, the group of optimal blocks has been found and thus actual coding is carried out using those $a_k$ ad λ (S20). Otherwise, when the group of optimal blocks are found in step S15, it is judged if it is the final frame (S21), and when it is not the procedure goes to the next frame, initializing the value of group of optimal blocks and $a_k$ (S22). When it is the final frame in step S21, the procedure is completed.

Figure 7A:
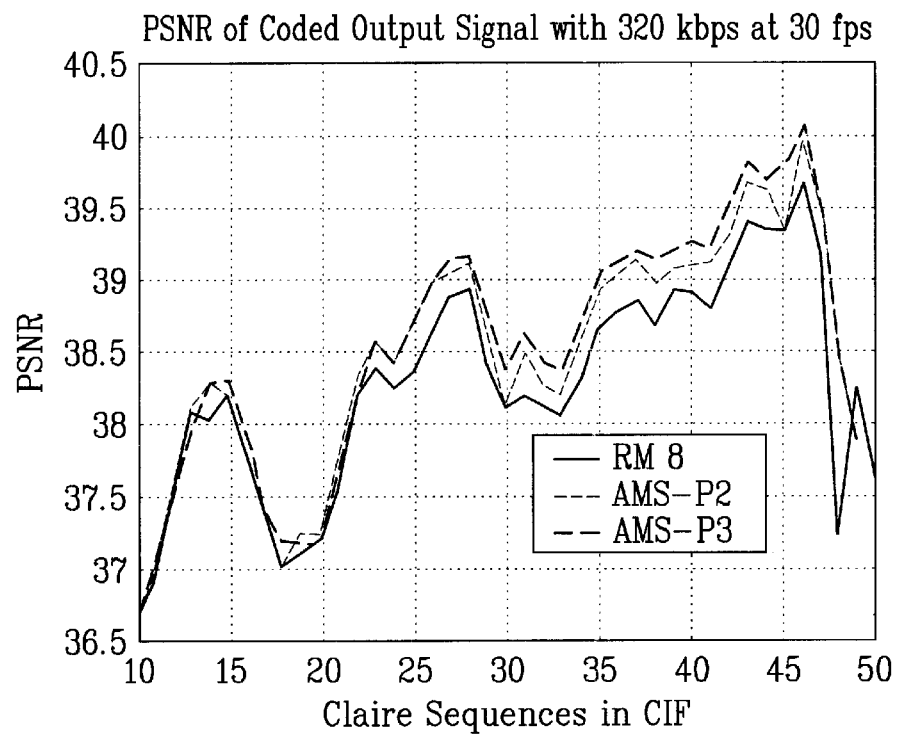
FIGS. 7A and 7B are graphs showing the relationship between PSNR and decision curve orders (from 2 to 5) of motion/no-motion compensation.
Figure 7B:
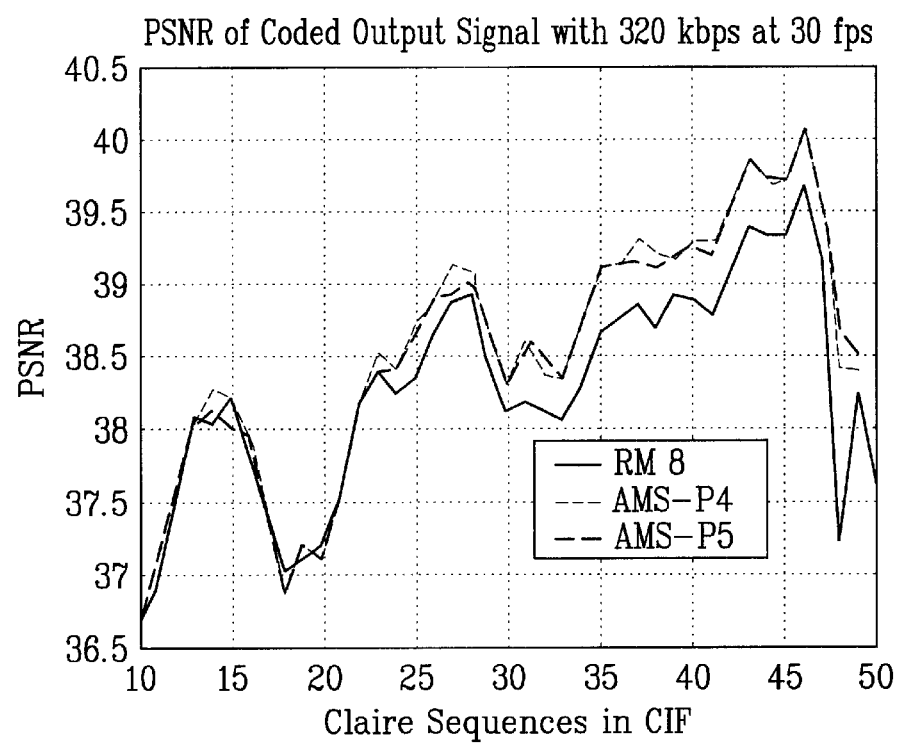

FIGS. 7A and 7B are graphs showing the relationship between PSNR and decision curve order (from 2 to 5) of motion/no-motion compensation. Referring to FIGS. 7A and 7B, for testing of the proposed approach, simulations were performed using various sequences in CIF format (352 pixels X 240 lines) for different degree of order from P=2 to 9 in equation (5). For this experiment, the frame rate is held constant at 30 fps and the average bitrate varies ranging from 128 kbps to 352 kbps. As a part of the encoding process, the modes are selected using the procedure described above, that is, process of obtaining the optimal motion/no-motion compensation coding curve and then obtaining the optimal intra/inter coding curve. The encoding results are compared with coded sequences generated by the video codec test model RM 8.

Figure 8A:
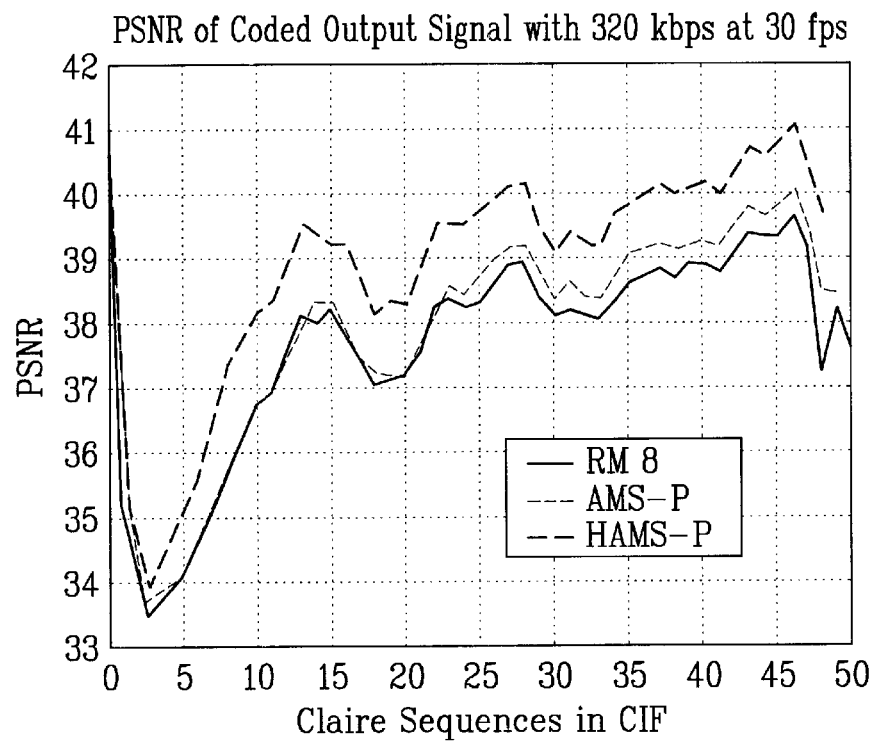
FIGS. 8A and 8B are graphs showing the relationship between PSNR and frame encoding rates in the case of encoding with HAMS and AMS in Claire.
Figure 8B:
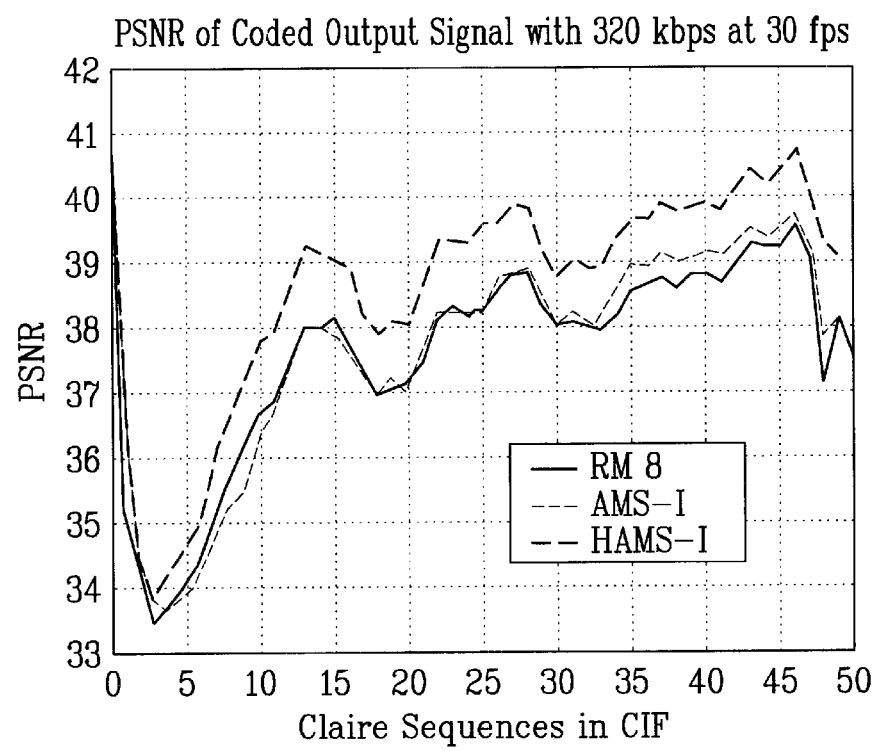
Figure 9A:
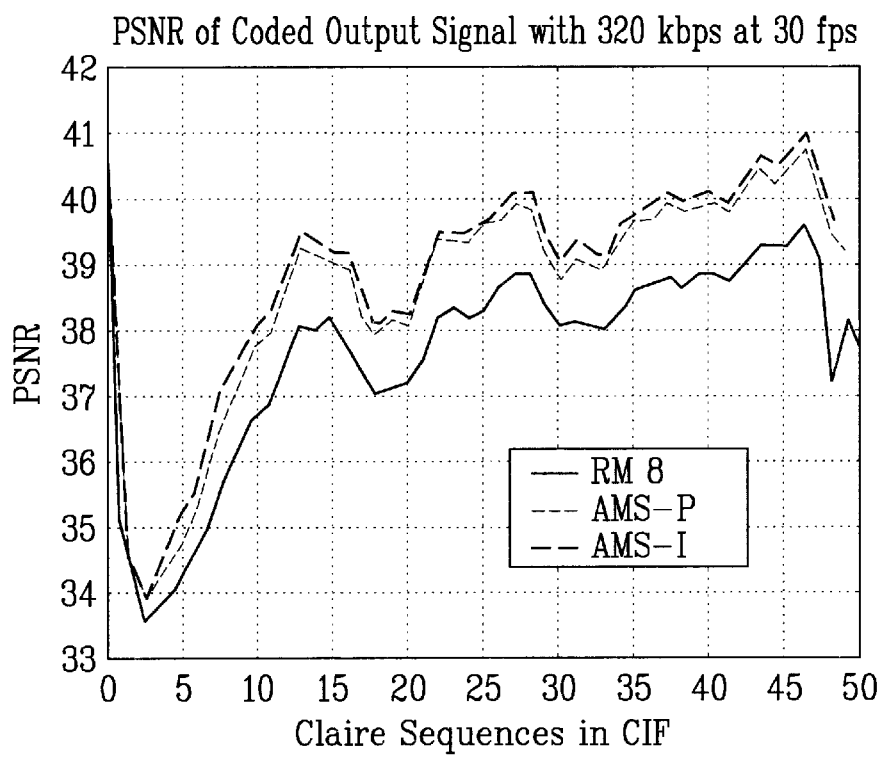
FIGS. 9A and 9B are graphs showing the relationship between PSNR and frame encoding rates in the case of encoding with HAMS in Claire.
Figure 9B:
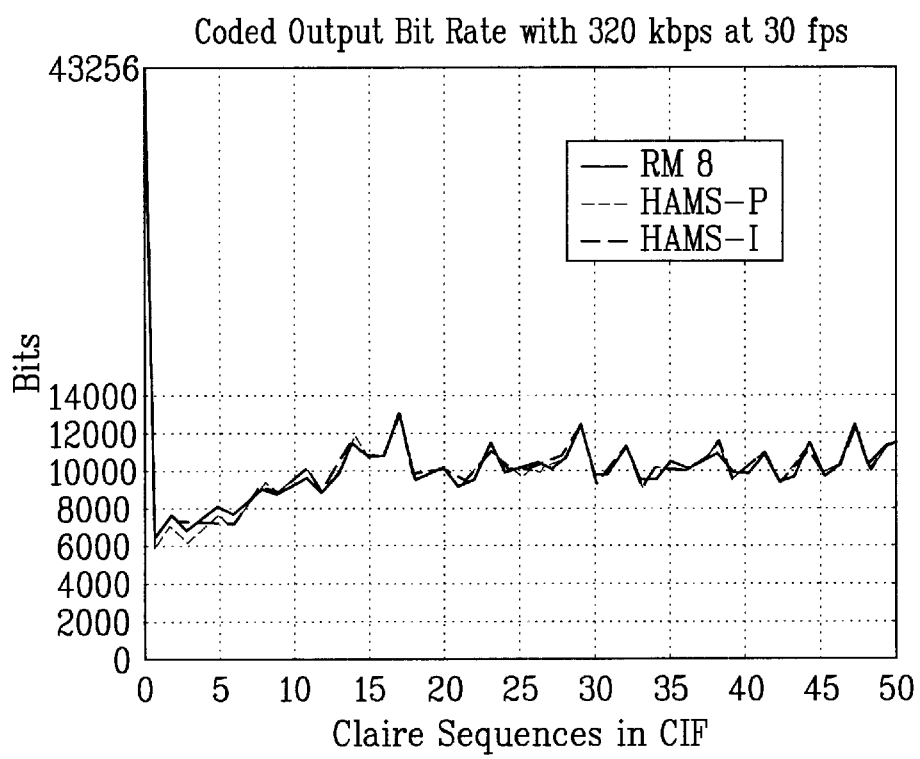

FIGS. 8A and 8B are graphs which show the relationship between PSNR and encoding rates in the case of encoding with Hierarchical Search Based Adaptive Mode Selection (HAMS) and AMS in Claire. Referring to FIGS. 8A and 8B, during the experiment, it has been found that the order of polynomial was optimal when P=3 for motion/no-motion compensation decision curve. In case of order below 3, satisfactory supplementary optimal coefficients were not obtained. PSNR was increased small while the computation increased significantly in case of order above 3. Through the experiment, it is found that the order of polynomial was optimal when P=2 for intra/inter coding decision curve. The above optimal orders of polynomials are shown in FIGS. 7A and 7B. Hierarchical search motion estimation is employed in order to reduce the complexity in obtaining of motion vectors and increase encoding performance. Motion vectors affect the modes of macroblocks according to hierarchical search motion estimation. The modes obtained using HAMS are different from modes selected according to adaptive mode selection. This is because of absolute difference or deviation between corresponding macroblock and current macroblock due to motions of motion vectors, different from each other, from the previous frames. FIGS. 9A and 9B show that HAMS approach is performed better than AMS approach.

FIGS. 9A and 9B are graphs showing the relationship between PSNR and encoding rates in the case of encoding with HAMS in Claire. Two different models of finding optimal decision curve using HAMS are compared with RM 8, i.e. finding optimal decision curve for motion/no-motion (HAMS-P) and inter/intra (HAMS-I). Proposed models provide consistent visual quality within and between frames as shown in FIGS. 8A and 8B. In order to check the effect of overflow and underflow of the buffer, relatively fast and slow bitrates are applied while other parameters are identical.

Figure 10A:
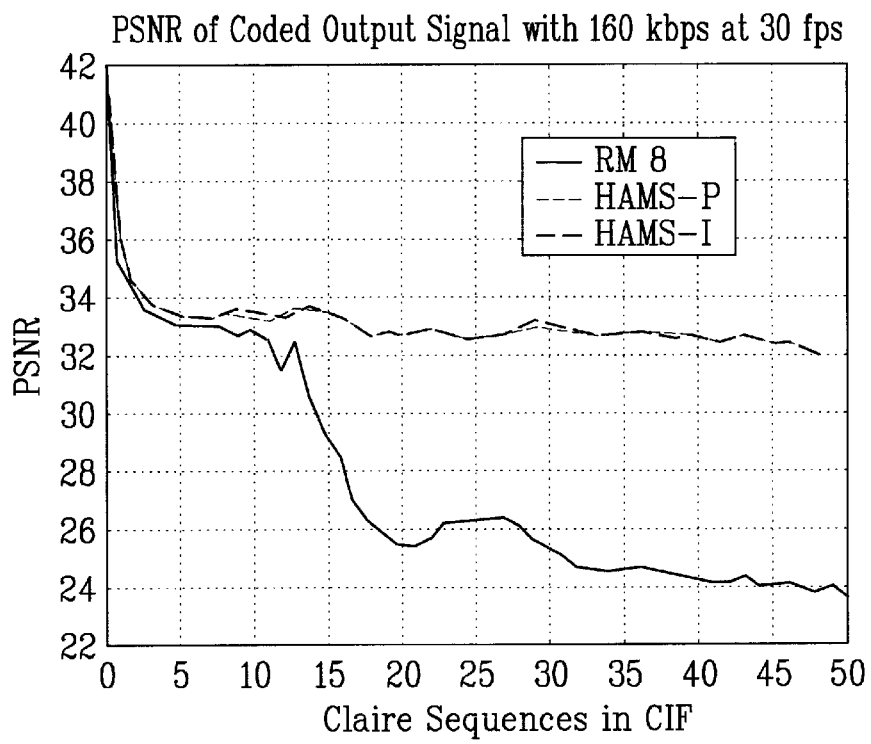
FIGS. 10A and 10B are graphs showing PSNR, buffer contents and effect of buffer overflow when frames are coded with 160 bps at 30 fps.
Figure 10B:
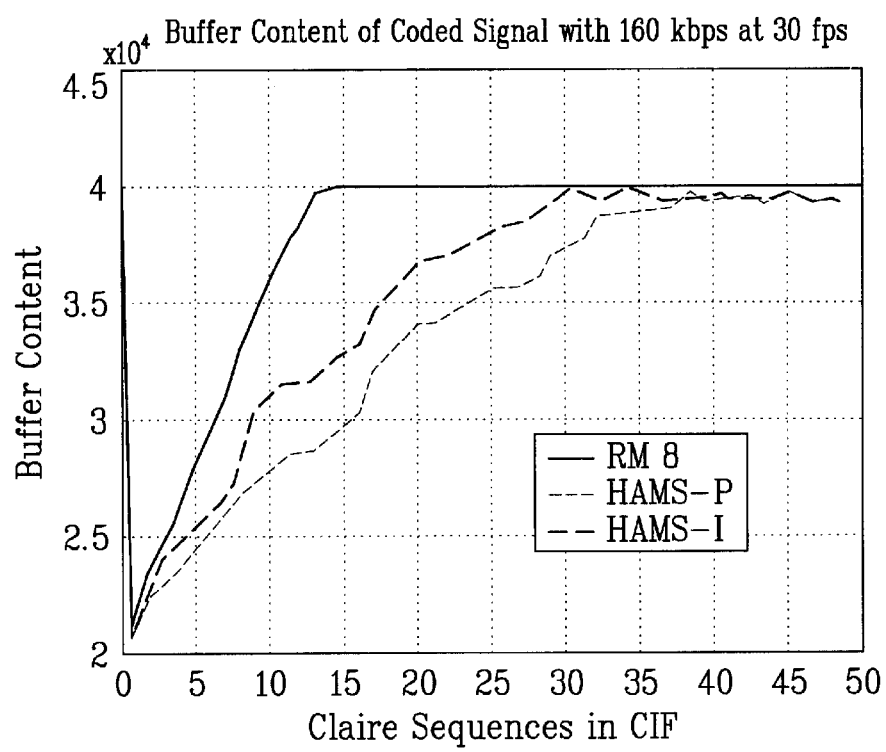

FIGS. 10A and 10B show corresponding PSNR, contents of buffer and effect of overflow and underflow of the buffer when frames are coded at 30 fps in 160 bps. Proposed approaches (HAMS-P and HAMS-I) are compared with RM 8. HAMS-P and HAMS-I mean corresponding output PSNR and frame rates when optimal mode for motion/no-motion decision function is selected and intra/non-intra coding function is selected, respectively. FIGS. 10A and 10B are graphs showing the relationship between PSNR and buffer fullness in the case of encoding with HAMS in Claire. Referring to FIGS. 10A and 10B, in experiment with RM 8, the buffer begins to fill significantly after frame 13 which forces RM 8 to repeat the previous frames (shown in FIG. 10B). However, with the proposed scheme, the buffer does not reach overflow state as macroblock modes are selected based on the optimal decision curves in all two models. Furthermore, visual quality of proposed approach until frame 13 before the buffer reaches overflow is better than a fixed model. In case of underflow of the buffer, proposed approach and visual quality of RM 8 are similar to those in overflow state because the smallest quantization parameters are used.

Figure 11A:
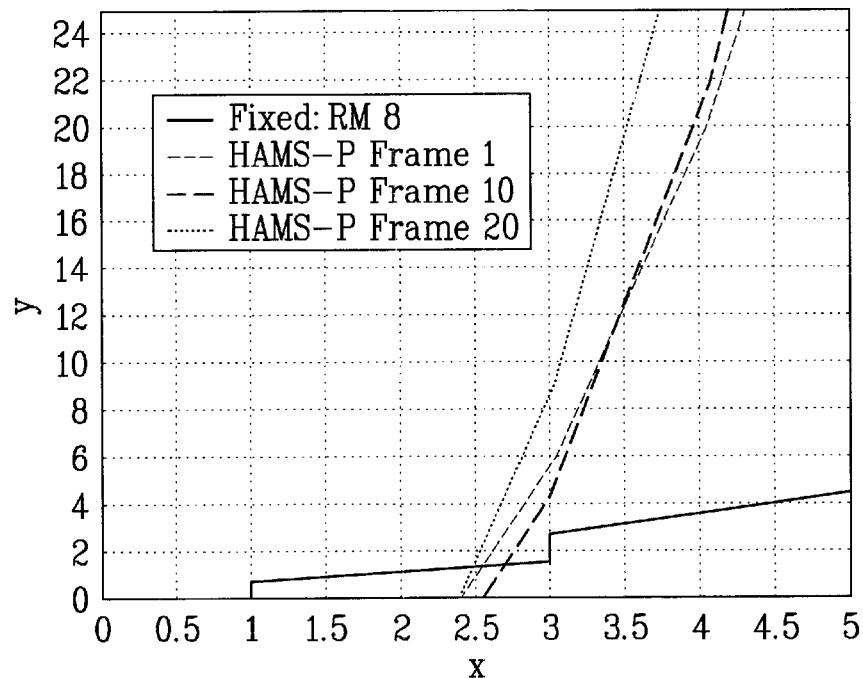
FIGS. 11A and 11B are graphs showing decision curves for motion/no-motion compensation and intra/inter frame coding.
Figure 11B:
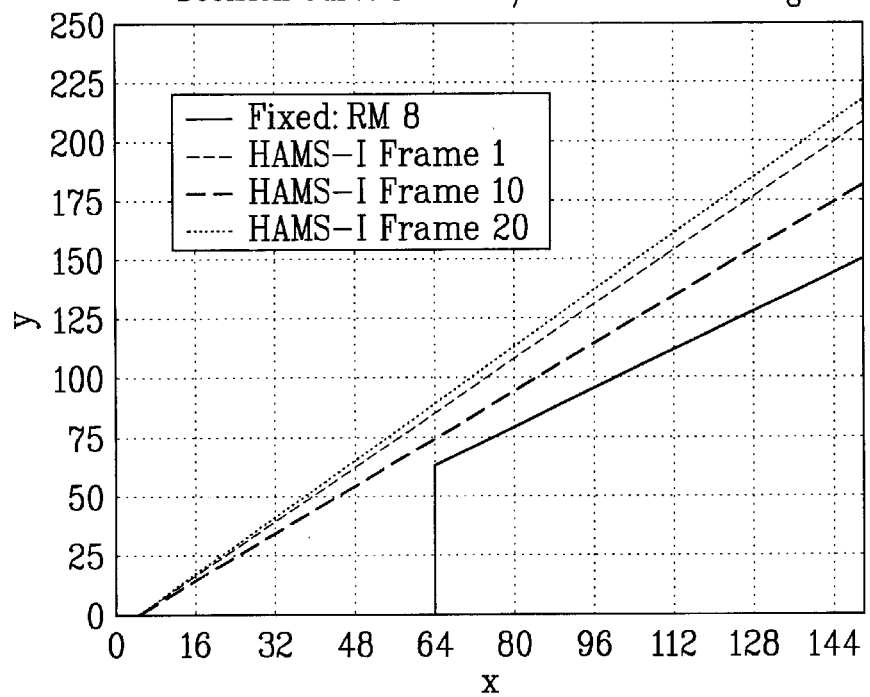
Figure 12A:
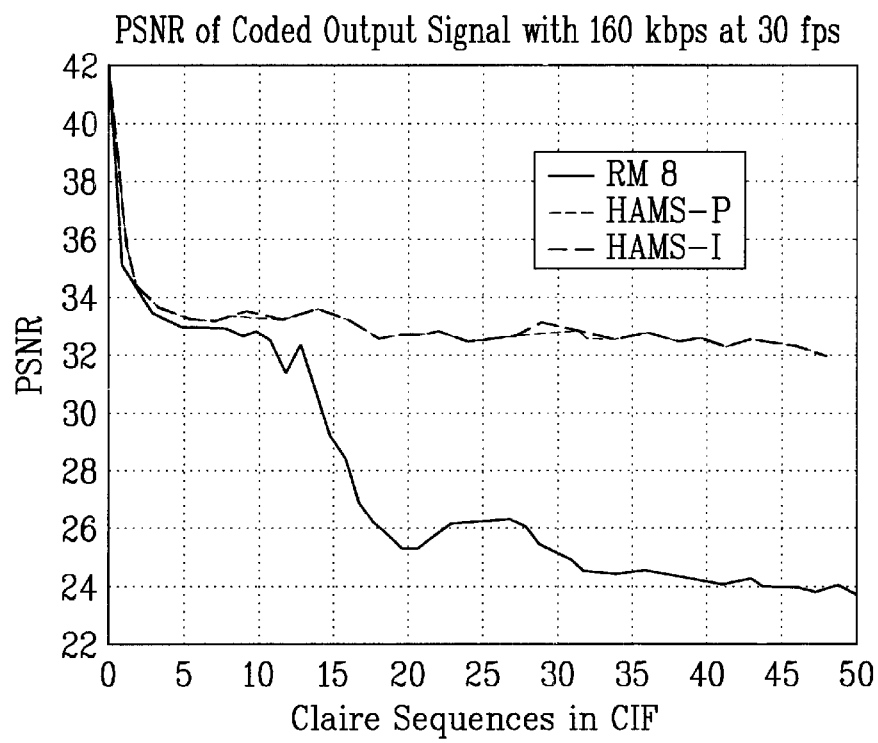
FIGS. 12A to 12D are graphs showing the relationship between PSNR and encoded frame rates in the case of encoding with 160 kbps and 179 kbps using HAMS in Claire.
Figure 12B:
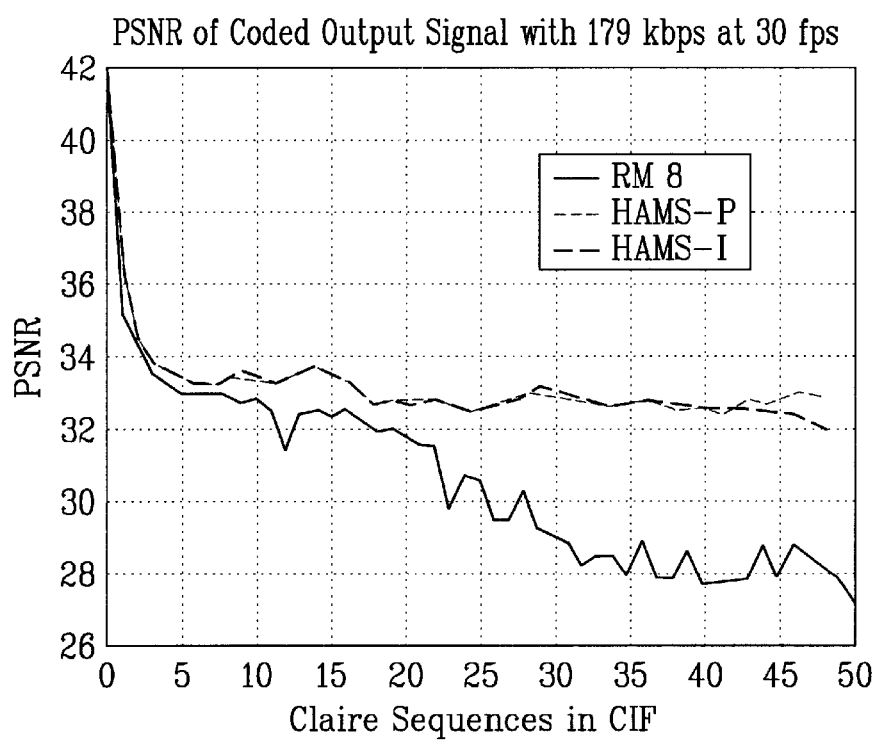
Figure 12C:
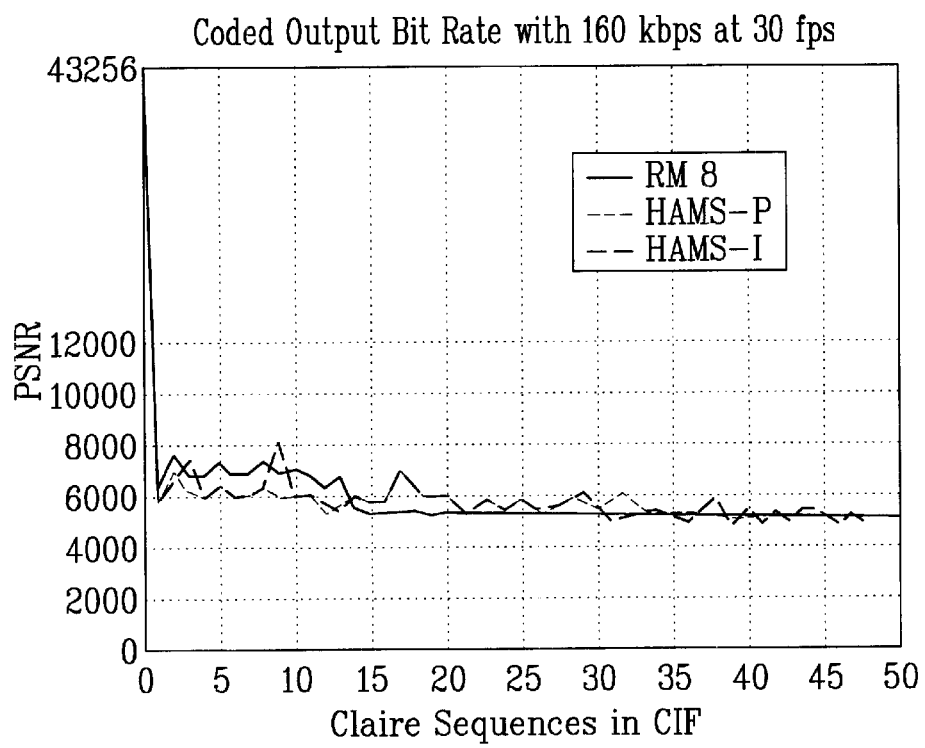
Figure 12D:
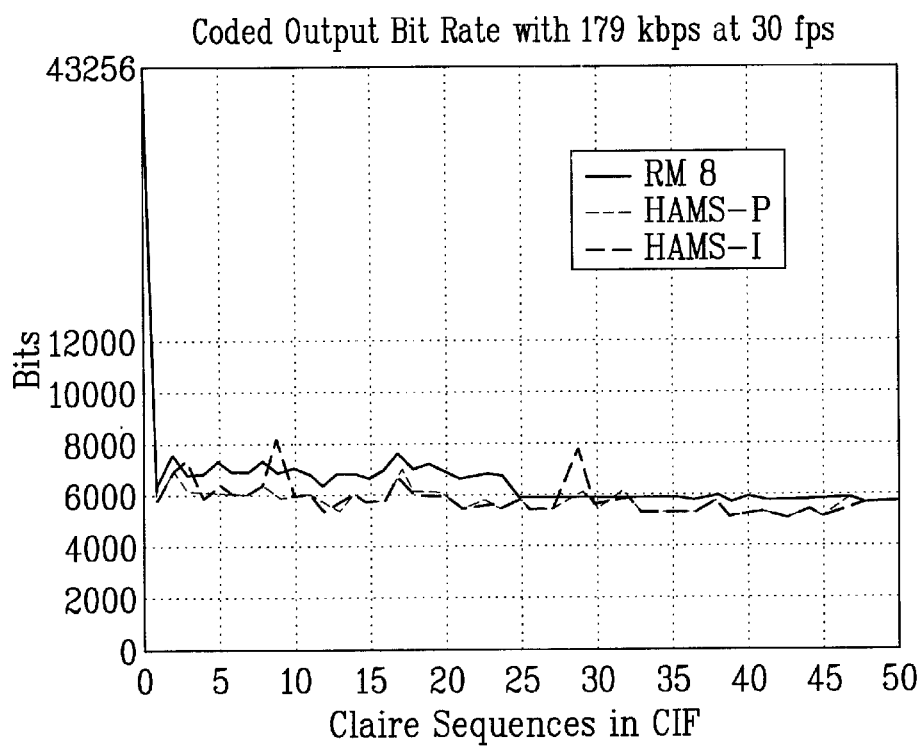
Figure 13A:
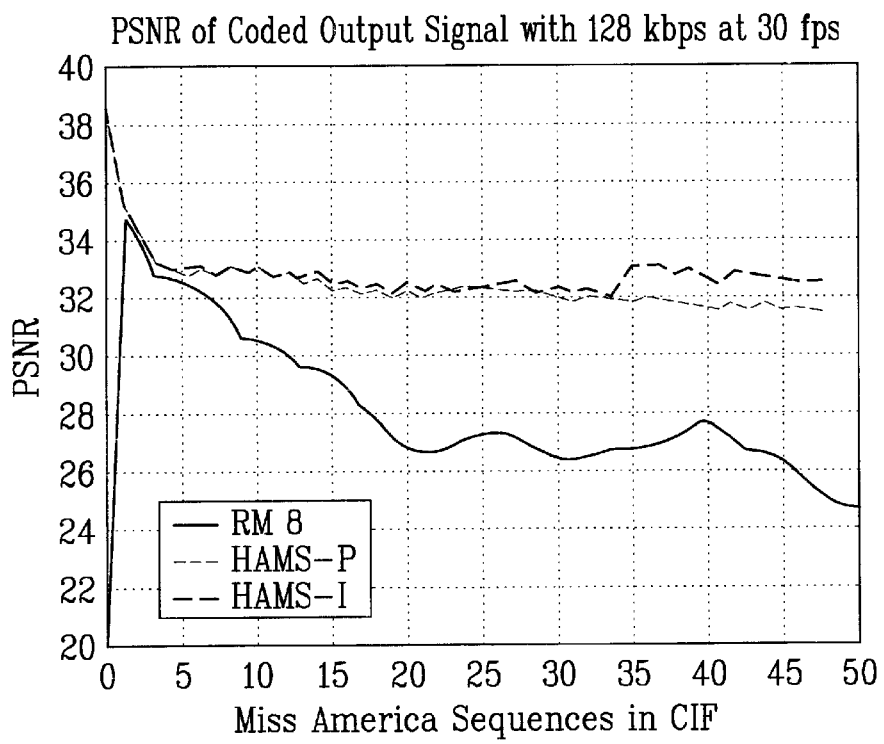
FIGS. 13A to 13D are graphs showing the relationship between PSNR and frame rates in the case of encoding with 128 kbps and 192 kbps using HAMS in Miss America sequences in CIF.
Figure 13B:
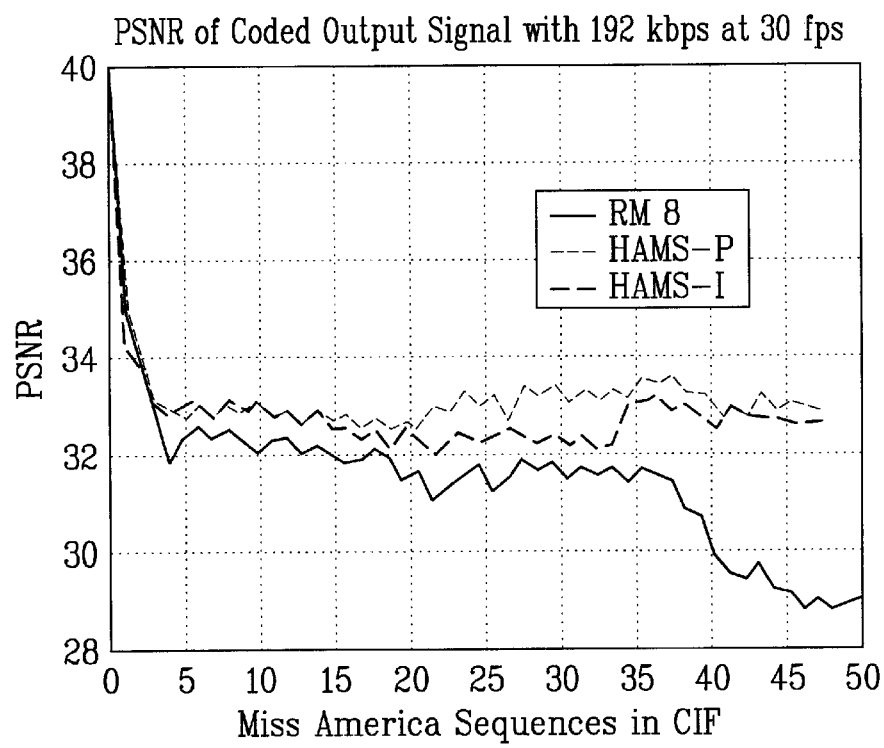
Figure 13C:
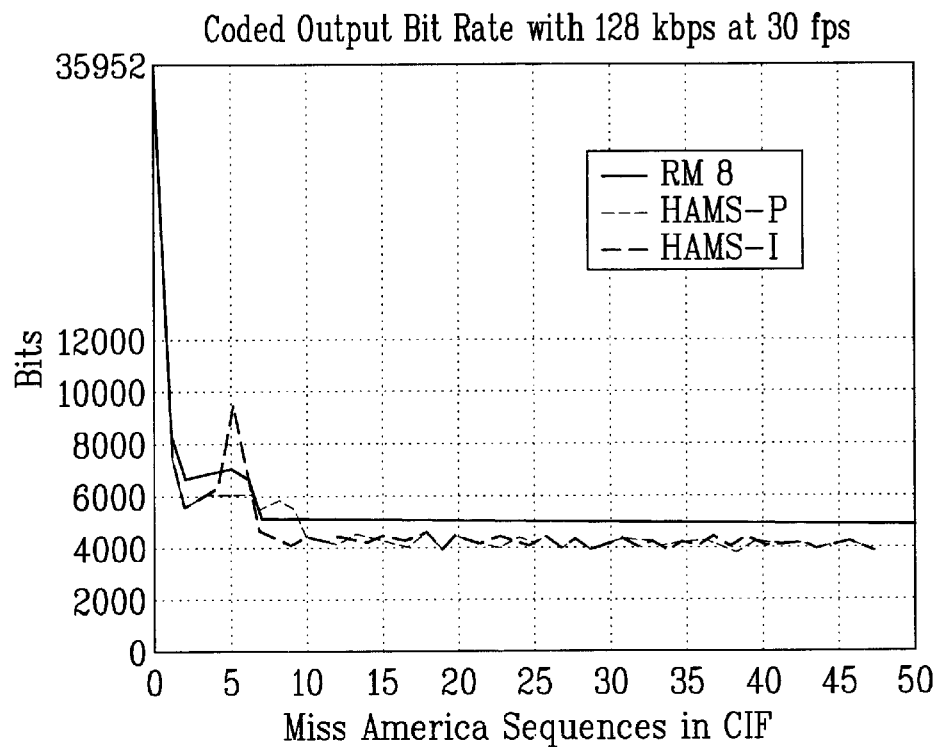
Figure 13D:
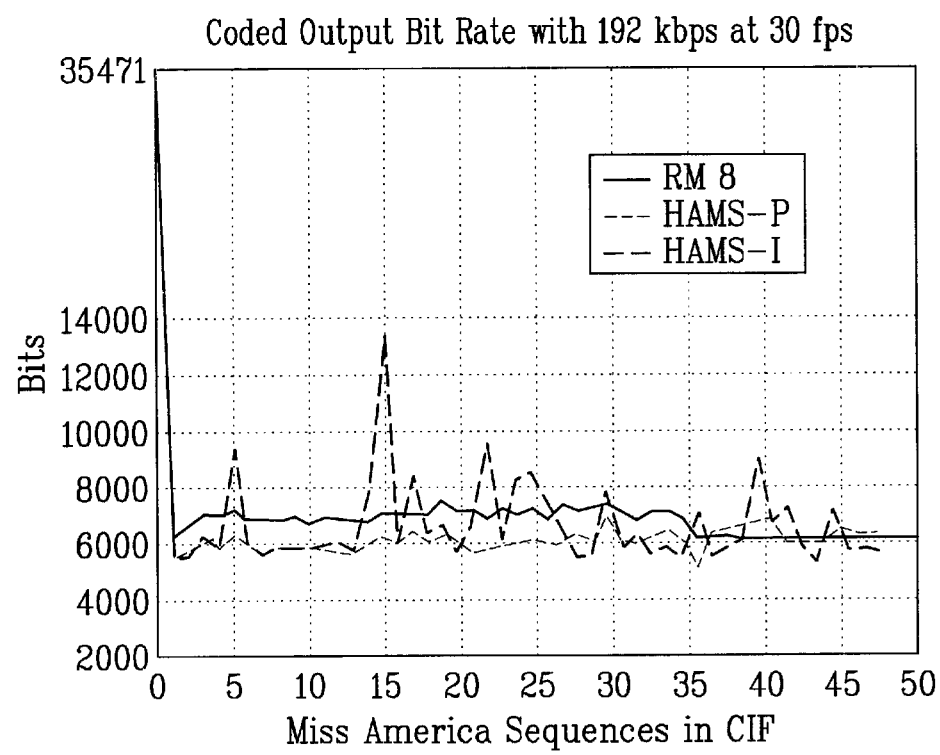
Figure 14A:
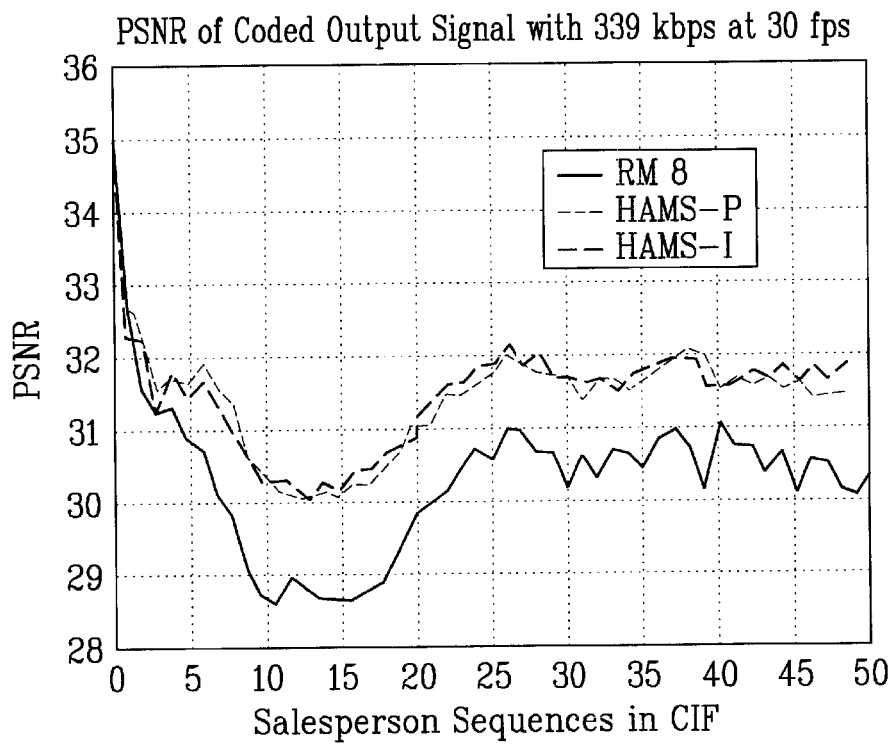
FIGS. 14A to 14D show PSNR, relation with frame rate, buffer fullness, and relation with MQIANT in the case of encoding with 339 kbps using HAMS in Salesperson sequences in CIF.
Figure 14B:
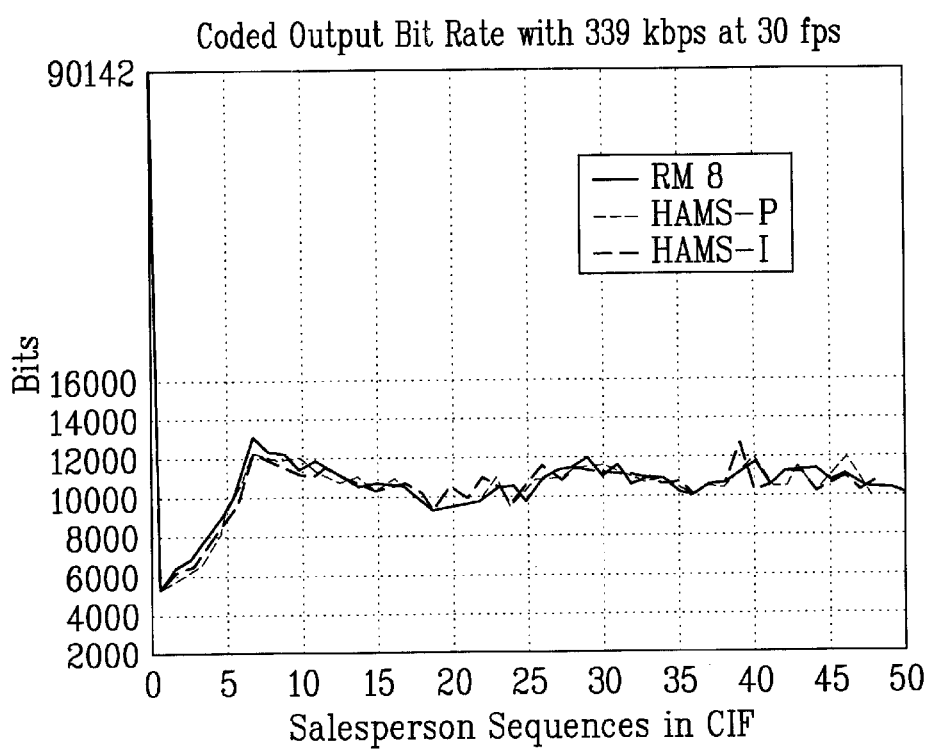
Figure 14C:
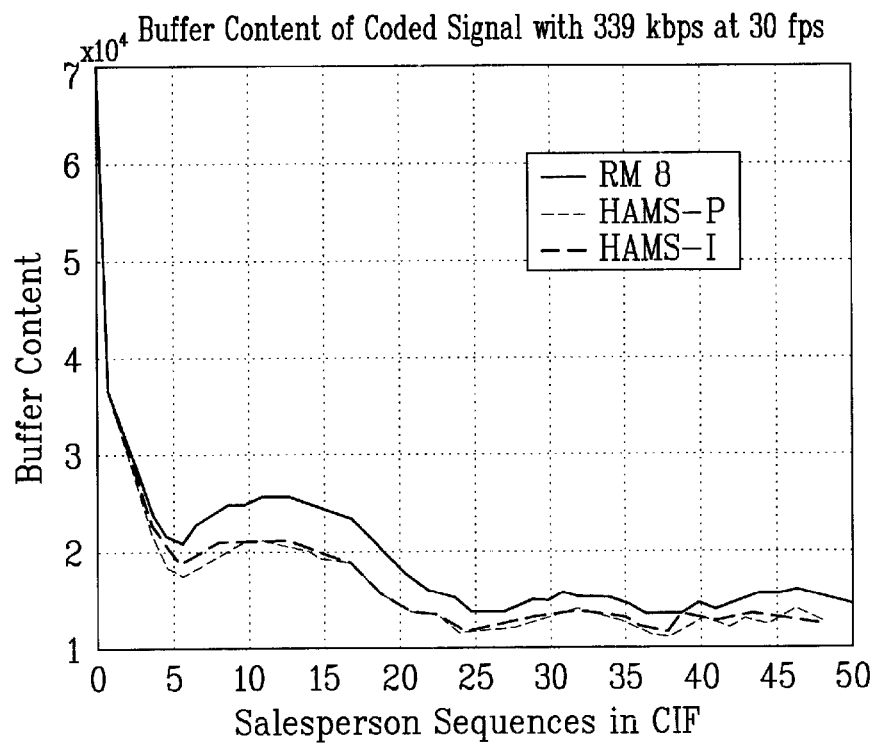
Figure 14D:
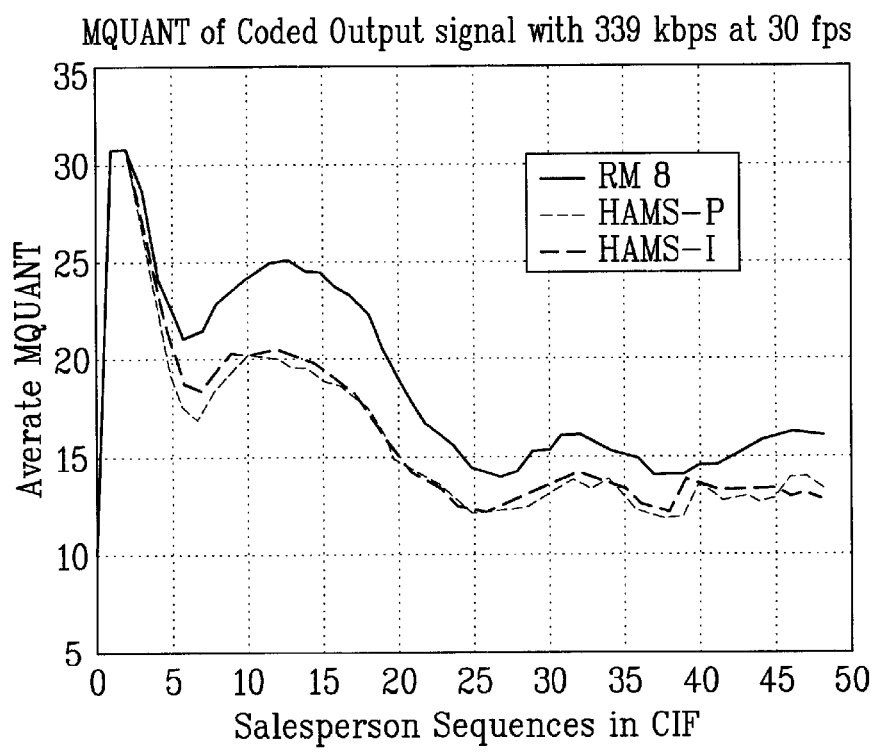
Figure 15A:
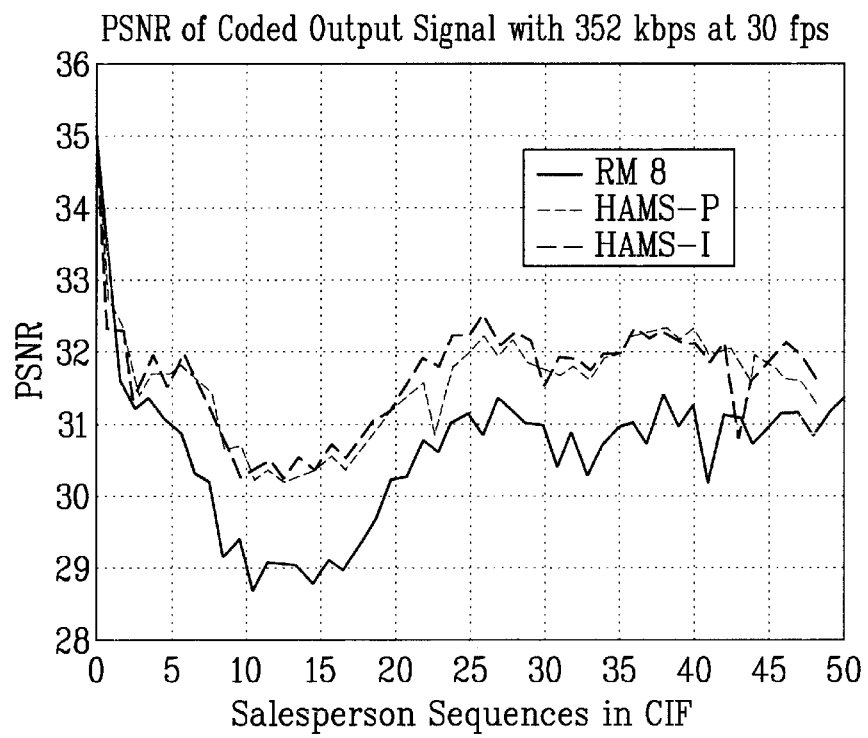
FIGS. 15A to 15D show PSNR, relation with frame rate, relation with buffer fullness, and relation with MQIANT in the case of encoding with 352 kbps using HAMS in Salesperson sequences in CIF.
Figure 15B:
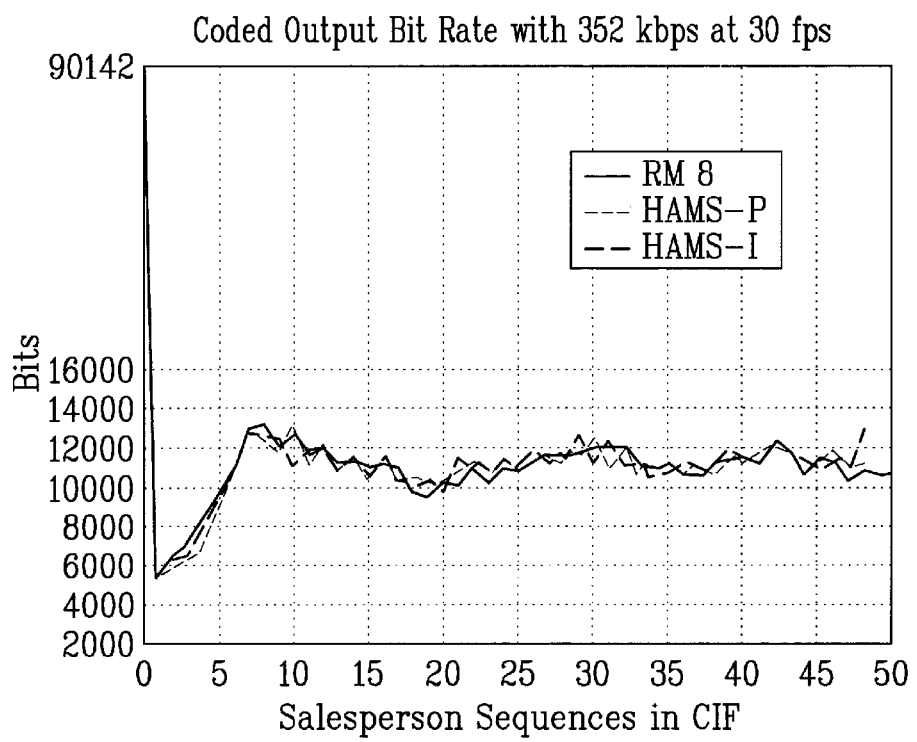
Figure 15C:
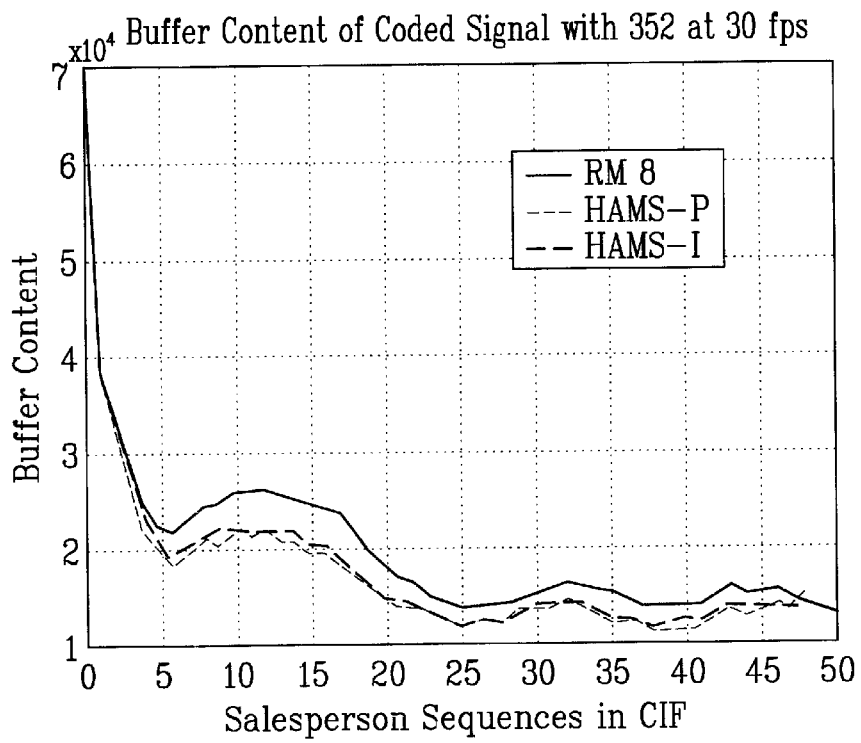
Figure 15D:
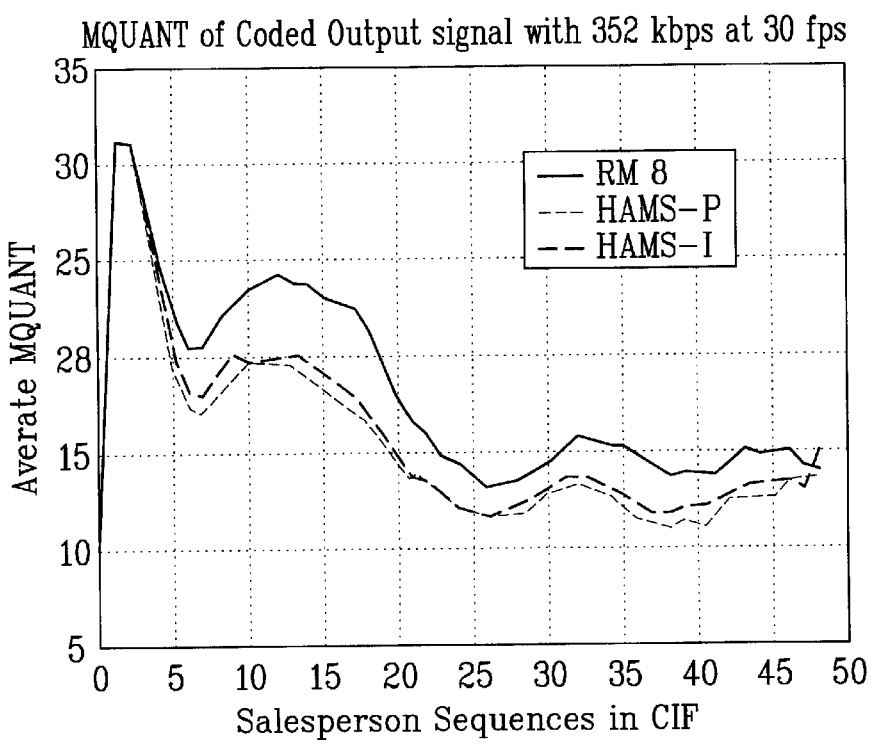

FIGS. 11A and 11B show motion/no-motion compensation curves and intra/inter coding decision curves. It can be seen in FIG. 11A that if the error magnitude is low (about 2.5 in HAMS case compared to 1.0 in FIGS. 11A and 11B) then no motion compensation is used. Obviously HAMS favors zero motion compensation and this can be explained by Lagrangian multiplier in the cost function. Intra/inter decision curves using HAMS favor intra frame encoding as shown in FIG. 11B. This explains why the optimal order of the polynomial in intra/inter decision curve is 2.

FIGS. 11A and 11B are graphs showing motion/no-motion compensation and intra/inter coding decision curves which are found in the case of encoding with HAMS, and FIGS. 12A to 12D are graphs showing the relationship between PSNR and encoded frame rates in the case of encoding using HAMS in Claire in 160 kbps and 179 kbps. Furthermore, FIGS. 12 to 15 show the results of lots of simulations using other bitrates and various sequences. It should be noted that difference in quality recognizable for conventional fixed encoding is quite large if buffer overflow occurs when bitrate is especially low due to repetition of frame. The visual quality is improved by 10 dB at lower bitrate when the proposed approach is used (shown in FIGS. 13A to 13D).

Moreover, the proposed approach provides uniform visual quality through frames. FIGS. 13A to 13D are graphs showing the relationship between PSNR and frame rates in the case of coding using HAMS in 128 kbps and 192 kbps in Miss America sequences, and FIGS. 14A, 14B, 14C and 14D show PSNR, relation with frame rate, buffer fullness and relation with MQUANT in the case of encoding using HAMS in 339 kbps in Salesperson sequences, respectively. FIGS. 15A, 15B, 15C and 15D show PSNR, relation with frame rate, buffer fullness and relation with MQUANT in the case of encoding using HAMS in 352 kbps in Salesperson sequences, respectively.

According to the present invention, the proposed method can obtain higher PSNR and better visual quality compared with standard quantizer feedback based bitrate control approach. Furthermore, the present invention can be applied to video compressor or video conference apparatus or communication terminal, to select optimal modes. Accordingly, it is possible to construct the video coder whose visual quality variation is smaller than that obtained in case of controlling by the conventional simple quantizer.

It will be apparent to those skilled in the art that various modifications and variations can be made in the video signal coding method of the present invention without departing from the spirit or scope of the invention. Thus, it is intended that the present invention cover the modifications and variations of this invention provided they come within the scope of the appended claims and their equivalents.

What is claimed is:

1. A method of encoding a video signal, comprising:
   determining an input/output restrictive condition;
   determining a decision curve based on the input/output restrictive condition, said determining step including:
   (a) generating a polynomial which represents the decision curve, and
   (b) finding coefficients of the polynomial which minimize global coding distortion based on the input/output restriction condition; and
   determining a mode for encoding the video signal based on the decision curve.

2. The video signal coding method as claimed in claim 1, wherein the decision curve corresponds to an intra/inter mode decision curve.

3. The video signal coding method as claimed in claim 1, wherein the decision curve corresponds to a motion/no-motion compensation mode decision curve.

4. The video signal coding method as claimed in claim 1, wherein the input/output restrictive condition is an output target bitrate of an encoder.

5. The video signal coding method as claimed in claim 4, wherein the target bitrate is determined according to a channel rate.

6. The method of claim 4, wherein an output target bit rate of the encoder is compared with an actual output bit rate.

7. The method of claim 6, wherein the output target bit rate is selected to minimize encoding distortion.

8. The video signal coding method as claimed in claim 1, wherein the input/output restrictive condition is based on a data characteristic of the block.

9. The video signal coding method as claimed in claim 8, wherein the data characteristic of the block shows a degree of variation between a current block and a previous block during encoding using the intra/inter mode decision curve.

10. The video signal coding method as claimed in claim 9, wherein the degree of variation is calculated with regard to a motion compensation vector between blocks.

11. The video signal coding method as claimed in claim 1, wherein variation in the decision curve occurs for every group of blocks in the video signal, each group being constructed of a specific number of blocks.

12. The video signal coding method as claimed in claim 11, wherein each group of blocks comprises unit frame.

13. The video signal coding method as claimed in claim 11, wherein each of the blocks is a macroblock constructed of at least one unit block.

14. The method of claim 1, wherein two different decision curves are optimized.

15. The method of claim 14, wherein a motion/no-motion decision curve and an intra/inter-coding decision curve are optimized.

16. The video signal coding method as claimed in claim 1, further comprising:
   determining whether a macroblock of the video signal is to be encoded using motion compensation or no-motion compensation, in accordance with steps that include comparing pixels in the macroblock to a curve generated based on the polynomial.

17. The video signal coding method as claimed in claim 16, further comprising:
   performing coding using motion compensation if the pixels are located on one side of the curve, and performing coding using no-motion compensation if the pixels are located on another side of the curve.

18. The video signal coding method as claimed in claim 1, wherein step (b) including determining the coefficients of the polynomial by minimizing a Lagrangian cost function.

19. The video signal coding method as claimed in claim 1, wherein step (b) includes determining the coefficients of the polynomial by controlling a Lagrangian multiplier of an unconstraint function.

20. A method of encoding a video signal, comprising:
   variably changing a decision curve based on at least one of a target bit rate and a distortion for each of a plurality of groups of macro blocks, said changing step including finding coefficients of a polynomial which minimize global coding distortion in each of the macro blocks, wherein the decision curve determines a mode of a specific block which is constructed of at least one unit block.

21. The video signal coding method as claimed in claim 20, wherein the decision curve corresponds to an intra/inter mode decision curve.

22. The video signal coding method as claimed in claim 20, wherein the decision curve corresponds to a motion/no-motion compensation mode decision curve.

23. The video signal coding method as claimed in claim 20, wherein the block is a macroblock constructed of at least one unit block.

24. The video signal coding method as claimed in claim 20, wherein the group of blocks is a unit frame.

25. A method of encoding a video signal, comprising:
sequentially determining a decision curve based on at least one of a target bit rate and a distortion, said determining step including:
(a) generating a polynomial which represents the decision curve, and
(b) finding coefficients of the polynomial which minimize global coding distortion; and
selecting a mode for encoding macroblocks in the video signal in accordance with the decision determined in the determining step.

26. The method of claim 25, wherein the decision curves are determined by comparing a target bit rate that minimizes encoding distortion with an output bit rate.

27. The method of claim 26, wherein the decision curves are determined independently of a channel buffer fullness.

28. The method of claim 25, wherein the optimal mode for macroblocks is determined such that a distortion for a given bit rate is minimized.

29. A method of encoding a video signal, comprising:
sequentially determining an optimal decision curve based on at least one of a target rate and a distortion; and
selecting an optimal mode for macroblocks in accordance with the decision curve determined in the determining step, wherein the optimal mode for macroblocks is determined such that a distortion for a given bit rate is minimized, and wherein distortion is minimized by determining a coefficient of a polynomial that minimizes a global coding distortion of a prescribed frame at the given bit rate.

30. The method of claim 25, wherein the determined decision curve is at least one of a motion/no-motion compensation decision curve and an intra/inter-coding decision curve.

31. The method of claim 25, wherein each macroblock comprises at least one unit block.

* * * * *